UNITED STATES PATENT OFFICE.

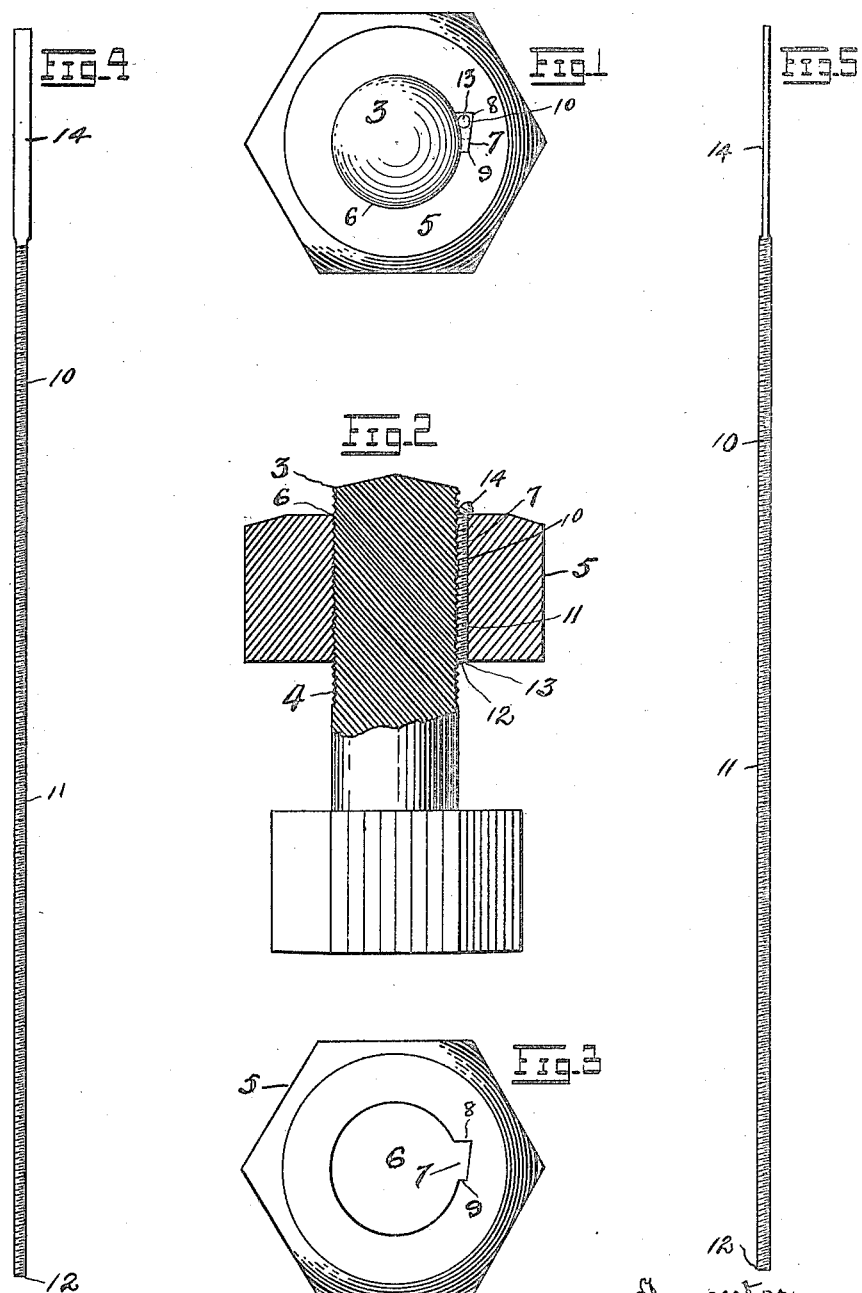

OTTO BOUTLIER, OF WINNIPEG, MANITOBA, CANADA.

NUT-LOCK.

1,252,995.  Specification of Letters Patent.  Patented Jan. 8, 1918.

Application filed March 26, 1917. Serial No. 157,453.

*To all whom it may concern:*

Be it known that I, OTTO BOUTLIER, a citizen of the Dominion of Canada, residing at the city of Winnipeg, in the Province of Manitoba, in the Dominion of Canada, have invented certain new and useful Improvements in Nut-Locks, of which the following is a specification.

This invention relates to nut checks or locks and contemplates the provision of means whereby a nut of conventional shape and size and with but slight change of structure may be securely and yet detachably locked upon a bolt. With this object in view the invention consists in the novel construction and combination of parts hereinafter first fully described in the specification and then more particularly pointed out in the appended claim, reference also being had to the drawings forming part hereof in which similar characters of reference refer to similar parts throughout the different views, and in which—

Figure 1 is an end view of a bolt having a nut and lock in accordance with the invention.

Fig. 2 is an elevation of the nut and bolt partly in section on the line 2 in Fig. 1 to show the locking means.

Fig. 3 is a view of the top of a nut constructed to receive the locking means.

Fig. 4 is a full length front elevation of the member, sections of which form the nut locking means, and Fig. 5 is a side view of the member shown in Fig. 4.

In the drawings 3 indicates a bolt of any desired size having the screw threads 4 formed for a portion of its length, and 5 is a nut having the usual interiorly screw threaded opening 6 to fit the bolt. The opening 6 in the present construction is formed with an offset recess 7 on one side, the said recess when the parts are assembled, forming a slot between the nut and bolt.

When the nut is of the familiar hot pressed variety the opening 6 and recess 7 are formed by the same punch and in the one operation, so that no extra expense is incurred on this item, and the recess presents no obstacle to the threading of the nut as the tap merely passes over it without cutting.

The recess of slot 7 is preferably formed with a wide end 8 and a narrow end 9, the position of these in the drawing indicating a right hand thread in the nut and bolt as the wide end of the recess is placed at the high end of the threads and the narrow end at the low end of the same. Had the threading been left handed the position of the wide and narrow ends of the slot would have been reversed.

The locking means for a plurality of nuts is provided by a member 10 which is merely a length of wire having a rough or corrugated surface 11 preferably formed by passing the wire through a die adapted to form a thread thereon in the same direction as that 4 on the bolt but fractionally different pitch.

In operation the nut 5 is turned down upon the bolt 3 a suitable distance, the end 12 of the member 10 being then inserted in the wide end 8 of the slot 7 and the member 10 rotated to screw it down preferably the full depth of the nut. It should be noted at this point that the member 10 when so placed is a slack or revoluble fit for the large end 8 of the slot, but that the interengagement of the threads in the bolt and member prevent the removal of the latter from the slot by any movement other than a reversal of that by which it was entered.

When so inserted in the slot 7 the member 10 is preferably broken off to leave the portion 13 thereof in the slot and the portion 14 turned over above the nut 5, the turned portion it will be observed, permitting of a partial rotation of the portion 13 in the slot, but preventing entire rotation of the same to remove it therefrom.

It should be here mentioned that the bent portion 14 of the member 13 is left as an additional factor of security and that this might be cut as shown in Fig. 1.

With the parts so assembled any movement of the nut on the bolt will have a tendency to roll the member 13 in the slot 7; this being the case, if the nut be moved clockwise to place it farther on the bolt 3, the tendency will be to roll the member 13 farther back into the large end 8 of the slot or at least to maintain it in the position indicated by the full line circle 13 in Fig. 1 in which position it will offer no opposition to the movement of the nut. On the other hand, should the nut 5 be moved counter-clockwise with a view to removing it from the bolt, the member 13 will be rolled toward the narrow end 9 of the slot thus becoming wedged between the nut and bolt at about the center of the slot and so preventing further movement of the nut.

It should be explained that if the parts are properly proportioned the retrograde movement of the nut to effect the locking is so small as to be negligible with regard to the position of the nut on the bolt, and no practical loosening of the nut results from any attempt to remove it.

To release the lock any instrument may be used that can be inserted between the end 9 of the slot and the member 13 to pry the latter back toward the end of the slot, but as a convenience the end of the member 10 is shaped to provide such an instrument, this being flattened out for a distance approximating the depth of the nut to form a part 14 of a width and thickness suitable to be inserted in the slot between the end 9 thereof and the member 13 to force the latter back; when this is effected the portion 14 of the member 10 is simply allowed to remain in the slot to prevent further locking while the nut is removed.

From the foregoing description it will be seen that my device provides in simple, practical and inexpensive form the means for effectively locking a nut upon a bolt, the locking members in suitable shape to be carried and broken off as required, and the key means to release the lock as a part of the latter and in such shape that an instrument for the purpose is always at hand when required.

Having thus fully described my said invention, what I claim is:—

A device of the kind described comprising a threaded bolt, a nut having a bore to fit the bolt, and means to lock the nut on the bolt, said means comprising a slot formed in the nut and crossing the threads on the bolt, one end of the said slot being larger than the other and a threaded rod adapted to loosely screw down into the larger end of the slot with its threads engaging the threads on the bolt, and to have its head turned over to prevent further complete rotation.

In testimony whereof, I affix my signature.

OTTO BOUTLIER.

Copies of this patent may be obtained for five cents each, by addressing the "Commissioner of Patents, Washington, D. C."